United States Patent [19]

Inoue et al.

[11] 4,152,570
[45] May 1, 1979

[54] DRIVE ASSEMBLY FOR MULTI-DIRECTIONAL LATERAL DISPLACEMENT BETWEEN TOOL AND WORKPIECE

[75] Inventors: Kiyoshi Inoue, Tokyo; Akihiko Shimizu, Iseharashi, both of Japan

[73] Assignee: Inoue-Japax Research Inc., Yokohama, Japan

[21] Appl. No.: 845,906

[22] Filed: Oct. 27, 1977

[30] Foreign Application Priority Data

Oct. 25, 1976 [JP] Japan .................. 51-130317

[51] Int. Cl.² ............................................. B23P 1/08
[52] U.S. Cl. ............................. 219/69 V; 204/224 M; 219/69 W; 310/12; 310/157; 318/115
[58] Field of Search ............... 219/69 V, 69 W, 69 M, 219/69 R, 69 E; 310/49 R, 12, 157; 318/115, 129, 132; 204/224 M

[56] References Cited

U.S. PATENT DOCUMENTS

| 2,561,890 | 7/1951 | Stoddard | 318/115 |
| 3,241,304 | 3/1966 | Mattingly et al. | 310/157 |
| 4,045,696 | 8/1977 | Lutz et al. | 310/49 R |

FOREIGN PATENT DOCUMENTS

| 1051540 | 12/1966 | United Kingdom | 219/69 V |
| 150743 | 4/1961 | U.S.S.R. | 219/69 V |

*Primary Examiner*—Bruce A. Reynolds
*Attorney, Agent, or Firm*—Karl F. Ross

[57] ABSTRACT

A tool electrode for the electrical machining of a workpiece is displaced in various directions by the selective energization of a plurality of electromagnets on a first member. The pole pieces of the electromagnet on this member are juxtaposed with a conical surface of another, magnetically susceptible member. One of these members, e.g. the magnetically susceptible member, is connected to the tool electrode while the first member is connected to a support.

8 Claims, 7 Drawing Figures

DRIVE ASSEMBLY FOR MULTI-DIRECTIONAL LATERAL DISPLACEMENT BETWEEN TOOL AND WORKPIECE

FIELD AND BACKGROUND OF THE INVENTION

The present invention relates to a drive assembly for multi-directional lateral displacement between a tool and a workpiece, suitable for use with electroerosion or other machine tools. The term "electroerosion" is intended herein to include electrical discharge machining (EDM), electrochemical machining (ECM) and electrochemical discharge machining (ECDM), all of which are known in the machining art.

In these machining processes, it is sometimes desirable to displace a tool electrode, relative to a workpiece which has undergone rough-machining, in a vertical direction (or along z axis), laterally or in a plane transverse to the latter (or along x and y axes) in a plurality of predetermined directions therein by increments, thereby finish-machining the workpiece. Such multi-directional lateral displacement may also be required when a workpiece rough-machined mechanically is to be finished by an electroerosion process and when a shaped block produced by a wire-cut EDM is to be utilized as a punch in a die-punching process whereby there should be provided an adequate clearance between the die and the punch by electroerosion. Besides such operating modes, the lateral displacement may be effected in the manner that the electrode is moved in an orbital travel path for electroerosion or another machining process. The requirement may also arise where a slanted wire electrode is displaced in wire-cut EDM to produce a tapered cut.

There have heretofore been proposed various arrangements for such multi-directional lateral displacement including one utilizing attraction or repulsion between a magnet and a set of magnetizable pieces coupled to the tool and the workpiece, respectively, or vice versa. In the latter system, the magnetic force must act at least in three or four directions and must be uniform in all directions. In the known system, however, the adjustment of a magnetic gap required to insure such multi-directional uniformity has imposed a difficulty and further the distance of displacement which must be adjusted according to a desired displacement pattern has not been readily adjustable and has been time-consuming.

BRIEF SUMMARY OF THE INVENTION

It is, therefore, the object of the present invention to provide an improved drive assembly for multi-directional displacement between a tool and a workpiece which overcomes the aforementioned disadvantages of the prior arrangement and whereby a highly precise adjustment is made possible and a desired displacement pattern is achieved with reliability and precision.

In accordance with the present invention, there is provided a drive assembly for multi-directional lateral displacement between a tool electrode and a workpiece in a machining process in which the tool, fixedly mounted on its support, is advanced relatively toward the workpiece fixedly mounted on its support and is also displaced relative to the workpiece transversely to said tool advancing direction during the machining operation, the drive assembly comprising a first member having a substantially conical surface and fixedly mounted to one of said tool and workpiece supports coaxially to said tool advancing direction, a second member having a substantially conical surface complementary to the conical surface of said first member and mounted so as to form a uniform gap spacing therebetween, one of said first and second members being displaceable in said transverse directions, one of said first and second members having a magnetic or magnetically susceptible material and the other having a plurality of pieces selectively magnetically activatable to displace, in cooperation with said magnetic material, said displaceable member in a direction determined by the magnetic activation of said pieces; and a third member coupled for relatively displacing at least one of said first and second members in said relative tool advancing direction to adjust the size of the gap spacing in said transverse directions.

In accordance with specific aspects of the invention, said plurality of pieces comprises pairs of electromagnets with each pair being located radially symmetrically. Each of said electromagnets is made responsive to a predetermined electrical signal which is preferably a train of pulses. A signal derived from the gap between the tool electrode and the workpiece representative of machining conditions therein may also be combined with the first-mentioned signal to energize each or predetermined ones of said electromagnets so that the lateral displacement proceeds in accordance with the machining conditions in the gap.

DESCRIPTION OF EMBODIMENTS

Figure 1:
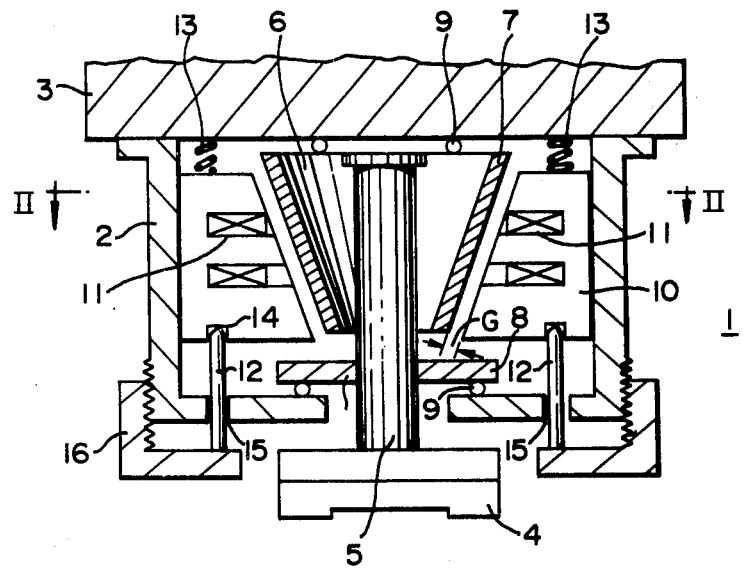
FIG. 1 is a diagrammatic elevational view in cross section of a certain embodiment of the drive assembly according to present invention.
Figure 2:
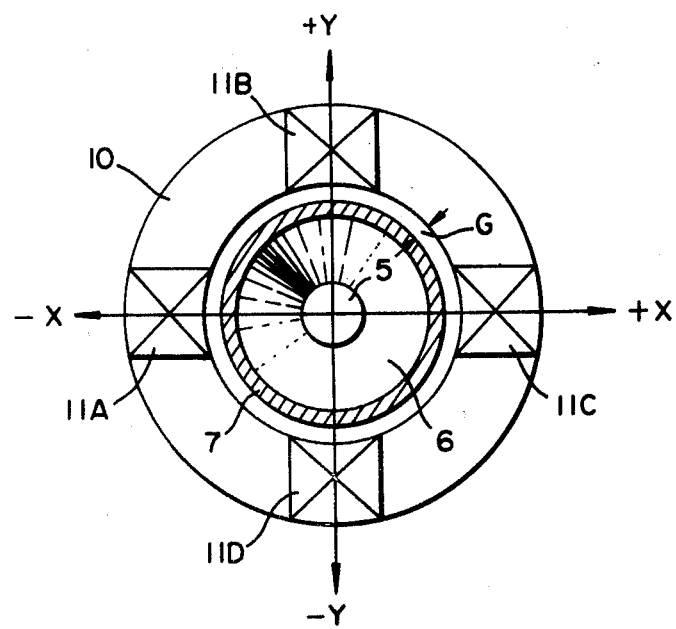
FIG. 2 is a diagrammatic cross-sectional view of the embodiment of FIG. 1 taken along the line II—II thereof.

A drive assembly illustrated in FIGS. 1 and 2 and denoted therein as 1 includes a housing 2 which is attached to a ram 3 of a machine tool such as an electroerosion machine. The assembly comprises a tool holder 4 adapted to mount an electroerosion electrode or other machining tool (not shown) thereon. The tool holder 4 is fixedly mounted to a shaft 5 and they together form a support for the tool. Mounted fixedly on the shaft 5 is a conical member 6 having a layer or piece 7 of magnetic material such as mild steel of ferrite attached thereon. The body member 6 and the layer or piece 7 may, of course, be otherwise integral and constituted by a unitary magnetically susceptible solid or body.

Attached also to the shaft 5 is a disk plate 8 which is disposed between the lower end of the conical member 6 and the tool holder 4. The upper surface of the conical member 6 is arranged to be slidable with bearings 9 against the lower end of the ram 3 and the plate 8 is similarly arranged with bearings 9 against the internal end surface of the cup-shaped housing 2 as shown so that the shaft 5 and the tool holder 4 may be displaced laterally.

The ram 3 is provided with a feed drive system (not shown) adapted to advance and retract the assembly 1 and hence the tool vertically. Thus, the normal machining mode proceeds as the tool is advanced in the vertical direction.

Juxtaposed with the conical member 6 coaxially therewith within the housing 2 is a female or second conical member 10 having a conical surface complementary to that of the first or male conical member 6 so as to form a uniform gap spacing G therewith. The second conical member 10 contains a plurality of electromagnets and may comprise a laminate of electrically magnetizable material such as silicon steel plates having at predetermined locations coils constituting such electromagnets. In the illustrated embodiment, two pairs of electro magnets, i.e. 11A and 11C; 11B and 11D, each located diagonally opposite, are uitlized as shown in FIG. 2. The second conical member 10 is as shown slidably received in the housing 2 and supported by a plurality of thrust-up pins 12 of a precisely equal length to each other and urged against the lower end of the ram 3 with a bias spring 13. The pins 12 extend from an annular groove 14 and are positioned through an annular opening 15 provided in the bottom of the housing 2 and rest on the bottom of a cup-shaped member 16 which is threadingly engaged with the housing 2 as shown to form an adjustable screw member with respect to the fixed housing 2.

Thus, turning the member 16 clockwise or counterclockwise provides a desired precision gap spacing G in the lateral direction between the outer surface of the male conical member 6 and the inner surface of the female conical member 10 and accordingly provides a precise extent of displacement of the tool secured to the tool holder 4. Although not specifically shown, the periphery of the cup-shaped member 16 is provided with graduations with respect to the fixed periphery of the housing 2 to indicate an adjusted extent of displacement.

Referring to FIG. 2, activation of the electromagnet 11A causes the movable member 6 to displace in the direction of $-x$ until the magnetic layer 7 is attracted to the magnetic pole 11A. The movable member 6 is displaced likewise in the direction of y with the electromagnet 11B activated, in the direction of x with the electromagnet 11C activated and in the direction of y with the electromagnet 11D activated.

The uniformity of the magnetic gap and accordingly the extent of displacement G over all directions is assured simply by the use of the movable member 6 and the stationary member 10 both with due roundness, conicity and coaxiality.

Thus, the formation of the magnetic gap G with confronting tapered surfaces and the use of the adjustable screw member 16 adapted to act on the laterally fixed member 10 via pins 12 to move the member 10 vertically render the magnetic gap spacing G readily adjustable accurately as desired. Accordingly, a simple manipulation of the adjusting member permits the adjustment of the gap over the entire range with ease. As noted previously, the adjusting screw 16 is provided with scale graduations. The adjustment with the aid of a vernier scale provides a simple and accurate adjustment and reading indicative of the extent of displacement which is exactly equal to the spacing of the magnetic gap adjusted.

Figure 3:
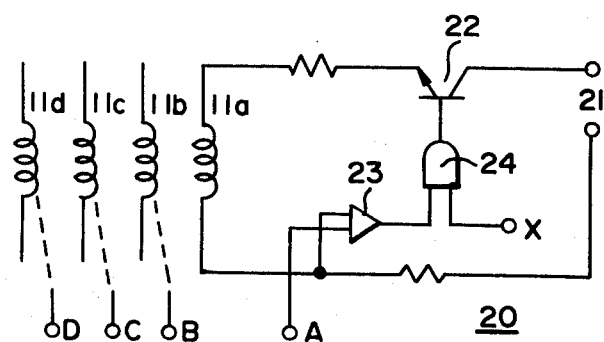
FIG. 3 is a circuit diagram of an operating network for electromagnets of FIGS. 1 and 2.
Figure 5:
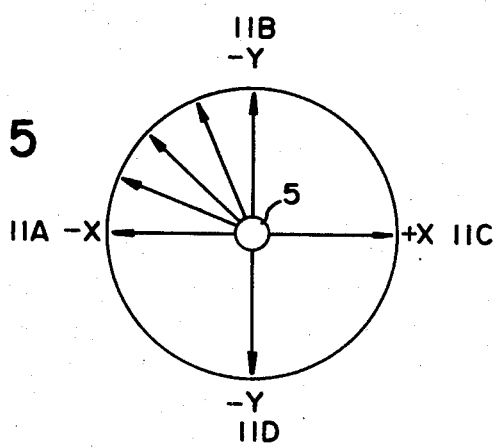
FIG. 5 is an illustration of displacement paths.

An exemplary circuit arrangement for operating each of electromagnets 11A, 11B 11C and 11D of FIG. 2 is illustrated in FIG. 3. The circuit 20 includes a power supply 21, a coil 11a (or 11b, 11c or 11d) for the electromagnet 11A (or 11B, 11C or 11D) and a transistor 22 connected in series therewith. The transistor 22 is switching- and conductivity-controlled by an input signal applied at a terminal A (or B, C or D) and fed across its base and emitter terminals through an amplifier 23 and a gate element 24.

With particular reference to the electromagnet 11A, for example, when an input signal is applied to the terminal A, the transistor 22 is rendered conductive to pass an energizing electric current through the coil 11a, the current being of a magnitude determined by the magnitude of the input signal. Same circuit arrangements of the basic configuration are used respectively for electromagnets 11B, 11C and 11D.

Figure 4:
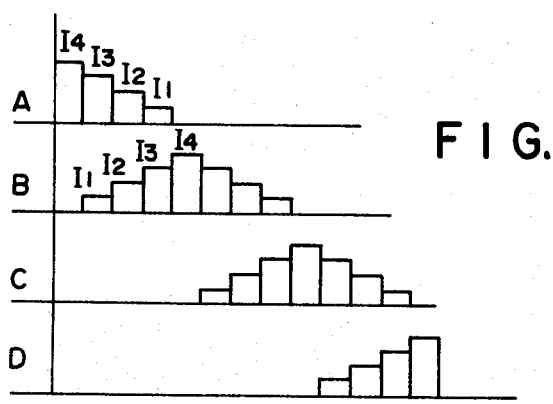
FIG. 4 is a waveform diagram of energizing current signals for the network of FIG. 3.

FIG. 4 illustrates an exemplary pattern of input signals which may be applied to terminals A, B, C and D of the circuit of FIG. 3. In this example, signals $I_4$, $I_3$, $I_2$ and $I_1$ are distributively applied to input terminals to effect lateral displacement in a desired direction, where relative magnitudes of these signals are: $I_4 > I_3 > I_2 > I_1$. Thus, with only the terminal A given the input signals $I_4$, the electromagnet 11A alone is activated to displace the shaft 5 in the direction of x by a distance adjusted. With the terminal A fed with the input signal $I_3$ and the terminal B with the input signal $I_1$, the direction of displacement is determined by the ratio $I_3/I_1$. When the terminals A and B are given each the input $I_2$, the shaft 5 is displaced toward the direction which is 45° apart both from x and +y axes. Likewise, when the terminal B alone receives the signal $I_4$, the direction of displacement is toward +y axis. Accordingly, the shaft 5 may be displaced as desired in response to an adequate combination of input signals applied to terminals A, B, C and D.

The number of electromagnets is, of course, not limited to four as illustrated and may be increased to eight, sixteen or more which are preferably located radially symmetrically.

The terminal x shown in FIG. 3 represents a second input terminal to the AND gate 24 which input is adapted to receive a signal from the machining gap, especially in case the drive assembly 1 and the operating circuit 20 are used with an electroerosion machine.

Figure 6:
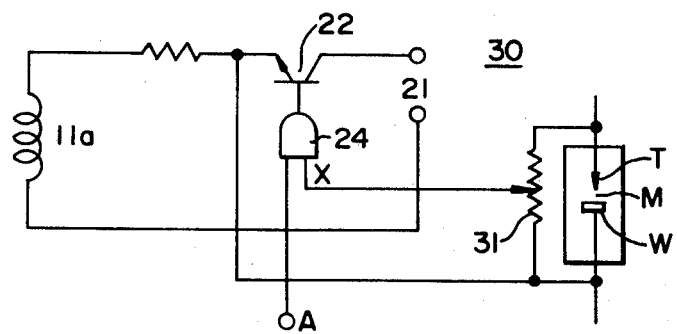
FIG. 6 is a circuit diagram of a system which is responsive both to a predetermined displacement signal and a signal derived from a machining gap for the drive assembly according to the invention used with an electroerosion machine.

More specifically, referring to FIG. 6, an embodiment of this aspect of the invention will be described. The circuit arrangement 30 shown therein includes, additionally to those shown in FIG. 3, a tool electrode T and a workpiece W spacedly juxtaposed with one another to form a machining gap M therebetween. The machining gap M is flooded with a dielectric liquid in EDM or a liquid electrolyte in ECM or ECDM while an electroerosion current in the form of discrete pulses in EDM or ECDM or a unidirectional continuous or discontinuous current in ECM is applied between the electrode T and the workpiece W to remove material from the latter by electrophysical actions or electrochemical actions or combination thereof. As material removal proceeds, a change may take place in machining conditions due to a number of variables which give rise to a fluctuation in gap size or even gap short circuiting or tendency to arc. The circuit arrangement of FIG. 6 is designed to respond to such gap conditions and to modify the mode of a predetermined lateral displacement of the tool, e.g., the rate of displacement, in accordance with the detected gap signal.

Included to this end is a detector resistor 31 connected across the maching gap M and having an adjustable potentiometer arm which is led to the second input terminal x to the AND gate 24. The resistor 31 develops thereacross a voltage which varies as a function of the size or condition of the machining gap M and derives therefrom a signal which is input to the gate 24. Thus, when the machining gap M is short-circuited or exhibits an unduly low impedance condition, "0" signal will appear at the input x which signal disables an "advance" signal from the input terminal A (or B, C and/or D) to pass through the gate 24 to the transistor 22, thereby deactuating the corresponding electromagnet to halt the displacement of the tool electrode T relative to the workpiece W until such "0" signal disappears. As long as machining continues under satisfactory conditions, the gate 24 remains enabled by "1" signal effective to the terminal x to permit a predetermined "advance" signal to be passed therethrough so that displacement of the electrode T may continue at a predetermined rate.

Figure 7:
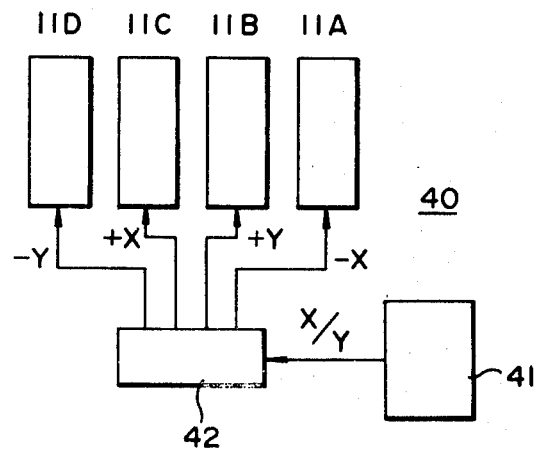
FIG. 7 is a block diagram of another embodiment for operating electromagnets.

FIG. 7 illustrates a different operating system 40 for the drive assembly 1 already described. In this system, a displacement signal in the form of x/y from a numerial control (NC) unit 41 is divided in a signal distribution unit 42 to produce allotted input (−x, +y, +x, −y) for operating electromagnets 11A, 11B, 11C and 11D, respectivelly to effect displacement toward a predetermined direction or with a predetermined angle from each axis in accordance with the information stored on a record medium. In this control system, too, the predetermined displacement drive signal can be combined with a signal representative of the size or condition of the machining gap M so that the lateral advance movement of the tool electrode T may be effected optimally in accordance with the gap condition.

The drive signal from the NC unit 41 is typically in the form of a train of discrete pulses. The pulsed signal may be advantageously utilized for operating each electromagnet with a circuit assembly shown in FIG. 3 as well. Thus, in a modified arrangement of FIG. 3, a series of pulses may be applied to the second input terminal x of the AND gate 24 while a continuous input signal is applied thereto from the terminal A as described previously. The result is an intermittent conduction of the transistor 22 which effects an intermittent activation of the electromagnet 11A, 11B, 11C, 11D to displace the shaft 5 incrementaelly. Since the magnetic cap spacing is preadjusted to establish extent of displacement with due accuracy according to the drive assembly of the present invention, a high-precision incremental lateral displacement of the tool for a predetermined distance is thereby achieved. In electrical discharge machining, such extent of displacement may be as small as 0.01 to 0.5 mm which permits the use of electromagnets of a small size with a low energizing current sufficient to effect a desired drive.

The drive assembly according to the present invention can also be used effectively for relative displacement between a tool and a workpiece along an orbited travel path and further for taper-cutting a workpiece with a travelling wire in a wirecut process. The term "multi-directional lateral displacement" should therefore be understood herein to include such modes of displacement.

Although the invention has been described in the foregoing with reference to a certain embodiment thereof, it should be understood that the invention permits various modifications. For example, electromagnets may be incorporated both to fixed and movable members to utilize their attractive and repulsive forces. Additionally to magnetic forces, there may also be used spring forces acting thereagainst. Further, in contrast to the embodiment illustrated, the laterally movable member 6 may contain electromagnets or magnetizable pieces 11 and the laterally fixed member 10 may contain or be constituted by a magnetically susceptible body or materail.

The adjustment of the magnetic gap between tapered surfaces may also be effected through vertical displacement of the laterally movable member 6 mounted on the spindle 5, or both of the movable and fixed members 6 and 10.

Furthermore, in the multi-directional lateral feed operation with a drive assembly according to the invention, the instance of change-over of displacement directions may be detected by sensing a change in electric or magnetic signals which may occur in the magnetic coil in response to stoppage of displacement and may be used to make a shift to the following displacement step.

The lateral displacement between a tool and a workpiece with a drive assembly according to the invention may also be effected simultaneously with the vertical machining or control movement of the tool relative to the workpiece during a machining operation.

We claim:

1. The drive assembly for multi-directional lateral displacement between a tool and a workpiece in a machining process in which the tool fixedly mounted to its support is advanced relatively toward the workpiece fixedly mounted on its support and is also displaced relative to the workpiece transversely to said tool advancing direction during the machining operation, the drive assembly comprising a first member having a substantially conical surface and attached to one of said tool and workpiece supports coaxially with said tool advancing direction, a second member having a substantially conical surface complementary to the conical surface of said first member and mounted so as to form a uniform gap spacing therebetween, one of said first and second members being movable in said transverse directions, one of said first and second members having a magnetically susceptible material and the other having a plurality of pieces selectively magnetizable to displace, in cooperation with said magnetically susceptible material, said movable member in a direction determined by the magnetization of said pieces; and a third member coupled for relatively displacing at least one of said first and second members in said tool advancing direction to adjust the size of the gap spacing in said transverse directions.

2. The drive assembly according to claim 1 wherein said plurality of pieces comprise pairs of electromagnets with each pair being positioned radially symmetrically.

3. The drive assembly according to claim 2 wherein said machining process is an electroerosion process, said electromagnets having their respective coils energizable by a predetermined pattern of signals determining a pattern of transverse displacement.

4. The drive assembly according to claim 3 wherein said third member is adapted to adjust said gap spacing in the transverse directions in the range between 0.01 and 0.5 mm.

5. The drive assembly according to claim 4 wherein said signal applied to at least some of said coils is in the form of a train of pulses.

6. The drive assembly according to claim 5 wherein pulses are applied distributively to said coils in accordance with a particular direction to be placed 7. The drive assembly according to claim 3 wherein said signals are modified in response to a second signal derived from the machining gap between the tool and the workpiece.

8. The assembly according to claim 2 wherein said member having at predetermined locations coils as the individual electromagnets.

* * * * *